United States Patent
Nakamura et al.

(10) Patent No.: US 6,931,741 B2
(45) Date of Patent: Aug. 23, 2005

(54) SCALE DEVICE

(75) Inventors: Gunichi Nakamura, Kanagawa (JP); Mitsuru Ohno, Kanagawa (JP)

(73) Assignee: Sony Precision Technology Inc., Tokyo (JP)

( * ) Notice: Subject to any disclaimer, the term of this patent is extended or adjusted under 35 U.S.C. 154(b) by 0 days.

(21) Appl. No.: 10/676,791

(22) Filed: Sep. 30, 2003

(65) Prior Publication Data

US 2004/0154181 A1 Aug. 12, 2004

(30) Foreign Application Priority Data

Feb. 10, 2003 (JP) ..................................... P2003-032512

(51) Int. Cl.[7] ............................ G01B 21/00; G01B 5/00
(52) U.S. Cl. ........................................ 33/306; 33/702
(58) Field of Search ............................. 33/706, 707, 708, 33/701, 702, 703

(56) References Cited

U.S. PATENT DOCUMENTS

| | | | |
|---|---|---|---|
| 4,389,757 A | 6/1983 | Luck et al. ................. 24/438 |
| 4,554,741 A | * 11/1985 | Affa ........................... 33/702 |
| 4,570,346 A | * 2/1986 | Burkhardt ................... 33/706 |
| 5,485,680 A | * 1/1996 | Nelle .......................... 33/705 |
| 5,488,782 A | * 2/1996 | Ochiai ........................ 33/708 |
| 5,842,283 A | * 12/1998 | Yatsu et al. ................. 33/706 |
| 5,987,768 A | * 11/1999 | Freitag et al. .............. 33/706 |
| 6,119,357 A | * 9/2000 | Ochiai et al. ............... 33/708 |
| 6,145,213 A | * 11/2000 | Shimano et al. ............ 33/702 |
| 6,442,861 B1 | * 9/2002 | Boge et al. .................. 33/706 |
| 6,578,283 B2 | * 6/2003 | Nishi .......................... 33/706 |
| 6,772,531 B1 | * 8/2004 | Henshaw et al. ........... 33/706 |
| 2002/0026725 A1 | 3/2002 | Kawada ...................... 33/706 |

FOREIGN PATENT DOCUMENTS

| | | | |
|---|---|---|---|
| DE | 42 16 825 A1 | 5/1992 | ........... G01B/21/16 |
| GB | 2 094 395 A | 9/1982 | ........... A44B/19/34 |
| JP | 2911746 | 4/1999 | ........... G01B/5/00 |

* cited by examiner

Primary Examiner—R Alexander Smith
(74) Attorney, Agent, or Firm—Haverstock & Owens LLP

(57) ABSTRACT

In a scale device including a scale unit (4) and detector (5), the scale unit (4) includes a scale member (6) formed from a long material and having at least a pair of fixing holes (12) formed therein across a position signal carrying area (11) defined thereon and which carries position signals, and a case member (7) housing the scale member (6) therein and having formed therein a pair of fixing holes (15) through which there is inserted a fastening member (13) to be screwed into a mounting hole (10) formed in a stationary part (2) of a machine to which the scale device is to be installed. The detector (5) is fixed to a moving part (3) of the machine, which moves relative to the stationary part (2), and includes a sensor (29) which moves oppositely to the position signal carrying area (11) on the scale member (6). The scale unit (4) is fixed to the stationary part (2) with the scale member (6) and case member (7) being fastened together by the fastening member (13). Thus, the scale member (6) different in linear expansion coefficient from the stationary part (2) can be installed to the latter with a high precision, and the scale device can make a measurement with a high accuracy, independently of environmental conditions.

12 Claims, 10 Drawing Sheets

SCALE DEVICE

This application claims the priority of the Japanese Patent Application No. 2003-032512 filed on Feb. 10, 2003, the entirety of which is incorporated by reference herein.

BACKGROUND OF THE INVENTION

1. Field of the Invention

The present invention relates to a scale device such as a position detector, digital scale device, encoder or the like for use on a machine tool, industrial machine, precision machine or the like to detect positional information such as a relative travel, position and the like of a moving part of such machines.

2. Description of the Related Art

Referring now to FIG. 1, a conventional scale device is schematically illustrated in the form of a partially fragmentary perspective view. Generally, the scale device, generally indicated with a reference number 100, is used on machine tools, industrial machines or precision machines of various types to detect positional information such as a relative travel, position or the like of a moving part such as a table, and the position of the moving part is controlled on the basis of a detection output from the scale device 100. As shown in FIG. 1, the scale device 100 includes a scale unit 103 having housed in a case member 102 thereof a long scale member 101 having optical, magnetic or mechanical position signals provided thereon, and a sensor unit 104 provided opposite to the scale member 101.

In the scale device 100, the scale member 101 is formed from a long plate of glass, for example, and has position signals provided longitudinally on one of the main sides thereof, which will not be described in detail herein. On the other hand, the case member 102 is formed from an aluminum alloy to have a generally U-shaped section, and somewhat longer than the scale member 101, for example. The case member 102 has the scale member 101 fixed inside it by bonding. The scale member 101 is fixed to the case member 102 by bonding with an elastically deformable silicone adhesive, for example. Thus the scale member 101 is protected. The scale device 100 has a mounting hole 105 formed in each of longitudinal end portions of the case member 102. With a mounting screw (not shown) driven in each mounting hole 105, the scale unit 103 is fixed to a first part of a machine on which the scale device 100 is to be used, for example, a stationary part.

In the above scale device 100, the sensor unit 104 is built in the scale member 101. The sensor unit 104 has a bearing mechanism provided on a slider. The slider has a substrate having a sensor mounted thereon, which is not illustrated and described herein. The bearing mechanism enables the slider to be freely slid longitudinally by the scale member 101 as a guide. The sensor unit 104 has provided thereon a coupling unit which is not described in detail herein. The coupling unit is held within a longitudinal guide opening 106 formed in the case member 102 opposing the scale member 101. The coupling unit extends out for integration with a mounting unit 107 provided thereon to form a detector unit 108.

The mounting unit 107 of the scale device 100 has a mounting hole 109 formed therein at either longitudinally opposite end thereof. With a mounting screw (not shown) driven in the mounting hole 109, the mounting unit 107 is fixed to a second part of the machine, for example, a moving part such as a moving table. The sensor unit 104 is electrically connected to an internal circuit unit such as a control circuit etc. incorporated in the mounting unit 107 via a flexible cable. The internal circuit unit in the mounting unit 107 is further connected to a controller, display unit, etc. of the machine via a cable 110 and connector 111 to provide information about the position signal detected by the sensor as an output. It should be noted that in the scale device 100, there may be provided on the mounting unit 107 a connector via which the internal circuit unit is connected to an external controller, display unit, etc. of the machine, for example.

Being interlocked with the moving part of the machine, the sensor unit 104 is moved by the mounting unit 107 in relation to the scale unit 103. The sensor in the sensor unit 104 detects the position signals provided on the scale member 101 of the scale unit 103 and supplies the detection output to the machine via the mounting unit 107 for controlling the moving part and for display on the display unit. It should be noted that in the scale device 100, the guide opening 106 formed in the case member 102 is closed along the whole length thereof by seal lip members (not shown) formed from rubber or the like and which are put in elastic contact with the outer surfaces of the coupling unit to prevent dust or the like from adhering to the scale member 101.

In the scale device 100, the scale member 101 required to be of a high precision is formed from glass and the case member 102 required to have excellent mechanical rigidity and workability is formed from an aluminum alloy. Namely, the scale member 101 is formed from one material while the case member 102 is formed from another material. They are fixed to each other by bonding with an adhesive which is elastically deformable. In addition, only the case member 102 is fixed with mounting screws to the mounting portion of a machine. Generally, the mounting portion of the machine is formed from a steel.

On the other hand, the scale member 103 of the scale device 100 is installed to the first part of the machine while the mounting unit 107 of the detector unit 108 is installed to the second part, moving in relation to the first part, of the machine as having previously been described. That is, the members, formed from different materials, of the scale device 100 are installed to the corresponding mounting portions, also formed from different materials, of the machine.

Generally, the glass used to form the scale member 101 has a linear expansion coefficient of about 8 to $9 \times 10^{-6} K^{-1}$, while the aluminum alloy as the material of the case member 102 has a linear expansion coefficient of about 23 to $24 \times 10^{-6} K^{-1}$. That is, the scale member 101 and case member 102 become largely different in dimensions from each other due to expansion or shrinkage depending upon the environmental conditions such as temperature, humidity, etc. In this scale device 100, a layer of the elastically deformable adhesive is used to absorb the dimensional difference between the scale and case members 101 and 102.

On the other hand, the steel used to form the machine has a linear expansion coefficient of about 11 to $12 \times 10^{-6} K^{-1}$. Since the case member 102 of the scale device 100 is fixed with the mounting screws to the mounting portion of the machine, the dimensional difference between the case member 102 and mounting portion of the machine due to expansion or shrinkage depending upon the environmental conditions such as temperature, humidity, etc. will be limited. Therefore, the scale member 101 of the scale device 100 will uniquely be expanded or shrunk depending upon the environmental conditions, so that the scale member 101 can hardly be positioned with a high precision in relation to the mounting portion of the machine. Thus, it is necessary to make a readjustment such as positioning the scale member 101 in relation to the sensor unit 104 with the scale unit 103 and detector unit 108 left installed on the machine. The readjustment is very troublesome. Also, in the scale device 100, the accuracy of measurement is lower depending upon environmental conditions, which will cause the machining precision of the machine to be lower.

OBJECT AND SUMMARY OF THE INVENTION

Accordingly, it is an object of the present invention to overcome the above-mentioned drawbacks of the related art by providing a scale device whose scale member, different in linear expansion coefficient from a case member of the scale device or a machine on which the scale device is to be used, can be installed with a high precision independently of environmental conditions or the like and which can make high-accuracy measurement and detection.

According to the present invention, there is provided a scale device composed of a scale unit including a scale member and case member, and a detector including a sensor. The scale member is formed from a long plate-like material and has position signals provided thereon. It has at least a pair of fixing holes formed across an area carrying the position signals. The fixing holes are spaced longitudinally from each other. The case member has the scale member housed and fixed therein, and has formed therein at least a pair of fixing holes spaced longitudinally from each other and through which there are inserted fastening members to be screwed into mounting holes formed in a first part of a machine on which the scale device is to be used. The detector is mounted on a second part, moving in relation to the first part, of the machine, in which condition the sensor is positioned opposite to the position signal carrying area on the scale member. When the scale unit is mounted on the mounting portion of on the first part of the machine with the case member placed between them, the fastening member is inserted through the fixing holes in the scale member and case member and then screwed into the mounting hole formed in the first part of the machine, whereby the scale member is fixed along with the case member to the first part of the machine.

In the scale device constructed as above according to the present invention, the scale unit is fixed along with the case member to the first part of the machine without having to modify the mounting structure, while the detector is fixed to the second part of the machine. As the machine is put into operation and thus the first and second parts of the machine move in relation to each other, the sensor in the detector moves relative to the scale member of the scale unit, and detects one of the position signals and provides a detection signal as an output. The scale member of the scale unit is fixed along with the case member to the first part of the machine with the aid of the fastening member, and so it will be integral with the first part. Therefore, even if the scale member is different in linear expansion coefficient from the mounting portions of the machine on which the case member or scale member and the detector are mounted, respectively, the free dimensional change of each member depending on environmental conditions can be so limited that the dimensional change of the scale member will generally be the same as that of the mounting portions of the machine. Thus, the scale member can be fixed to the mounting portion of the machine with a high precision. The scale device can thus measure travels of the first and second parts of the machine in relation to each other with a high accuracy.

These objects and other objects, features and advantages of the present invention will become more apparent from the following detailed description of the preferred embodiments of the present invention when taken in conjunction with the accompanying drawings.

DETAILED DESCRIPTION OF THE PREFERRED EMBODIMENTS

The present invention will be described concerning the embodiments thereof with reference to the accompanying drawings.

Referring now to FIGS. 2 to 5, there is illustrated the first embodiment of the scale device according to the present invention. The scale device, generally indicated with a reference number 1, is to be installed to first and second parts 2 and 3 of a precision machine tool or the like on which the scale device 1 is to be used. The first and second parts 2 and 3 of the machine move in relation to each other. The scale device 1 accurately detects positional information such as travels of the first and second parts 2 and 3 in relation to the other, positions of the first and second parts 2 and 3 or the like, and supplies a detection signal to a controller or the like. The controller will accurately control the positions of the first and second parts 2 and 3 on the basis of the received detection signal. It should be noted that in the following explanation, the languages "top (upper)", "bottom (lower)", "right", "left", "inner" and "outer" are based on the state of the scale device 1 shown in FIG. 2.

Figure 3:
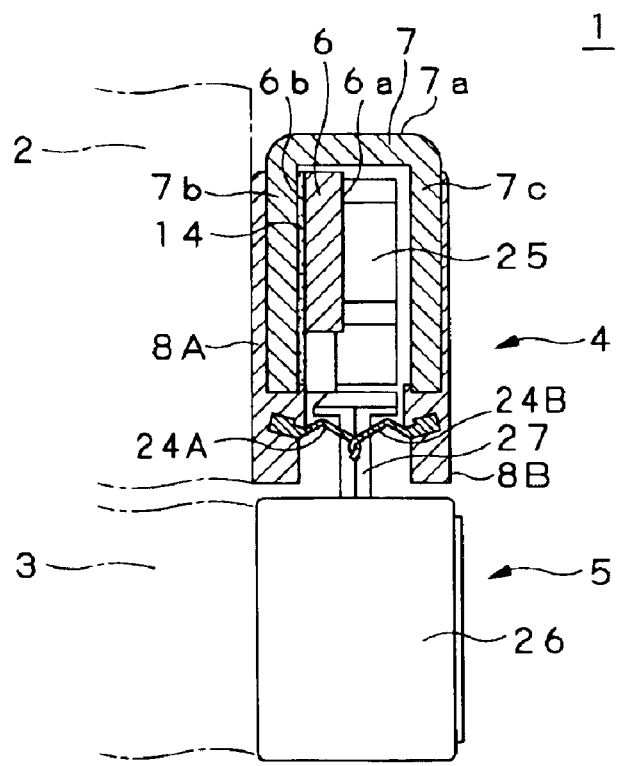
FIG. 3 is an axial sectional view of the substantial part of the scale device in FIG. 2.

As shown in FIG. 3, the scale device 1 includes mainly a scale unit 4 to be installed to a stationary part (of the machine) as the first part 2, which will not be described in detail herein, and a detector 5 to be installed to a moving part (of the machine) such as a table or the like as the second part 3, which also will not be described in detail herein. In the scale device 1, when the detector 5 slides in relation to the scale unit 4 as the moving part 3 of the machine move, it detects the position signals provided on the scale unit 4 as will be described in detail later. The detector 5 outputs the position information to the aforementioned controller. It should be noted the scale device 1 may be installed to the machine with the detector 5 mounted on the stationary part 2 and the scale unit 4 mounted on the moving part 3. Also, the scale device 1 may have the scale unit 4 and detector 5 mounted on the first and second parts 2 and 3, respectively, which move, as moving parts, in relation to each other, of the machine.

In the scale device 1, the scale unit 4 includes a scale member 6, a first case member 7 in which the scale member 6 is housed and fixed, a pair of second case members 8A and 8B enclosing the first case member 7 (will generically be called "second case member 8" hereunder wherever they may not be referred to individually), and a pair of side case members 9A and 9B, right and left (will also generically be called "side case member 9" hereunder wherever they may not be referred to individually). The scale member 6 is formed from a rectangular plate of an aluminum alloy for extrusion, for example. It is somewhat longer than a scale mounting portion formed on the stationary part 2 of the machine and where an internally threaded mounting bore 10 (see FIG. 5) is formed. The scale member 6 has defined on a first main side 6a thereof (which is shown on this side in FIG. 2) a predetermined longitudinal area 11 where position signals are recorded in line. The area 11 will generically be called "position signal carrying area 11" hereunder.

On the scale member 6, there is formed the position signal carrying area 11 where predetermined magnetic signals necessary for position detection are magnetically recorded in a coating layer formed by applying a magnetic paint to the first main side 6a or in a magnetic thin layer formed on the first main side 6a by sputtering, plating or the like. In case the scale member 6 is formed from a ferromagnetic metal, position signals are magnetically recorded directly in an area corresponding to the position signal carrying area 11. In the scale member 6, the position signals may be formed not only by the aforementioned magnetic method but by any appropriate method such as an optical method, mechanical method (to form irregularities) or by a combination of them. It should be noted that the scale member 6 is not limited in material to the aluminum alloy but may be formed from a metal, glass or the like.

Figure 1:
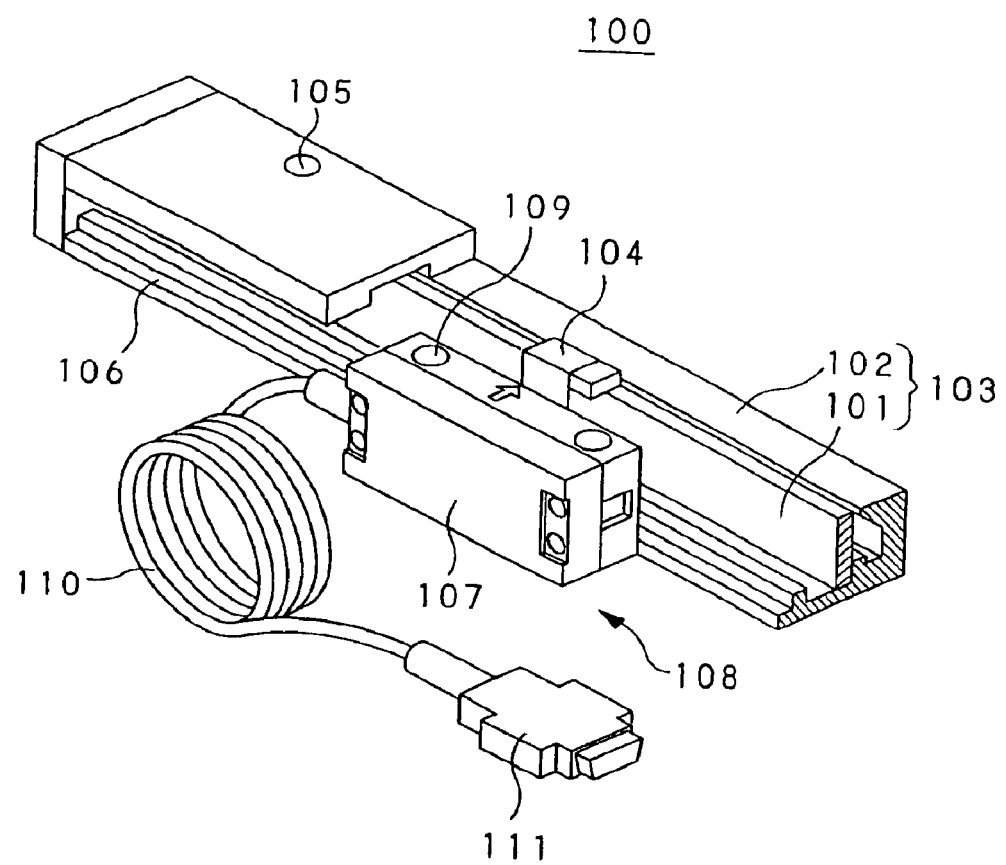
FIG. 1 is a partially fragmentary perspective view of the conventional scale device.
Figure 2:
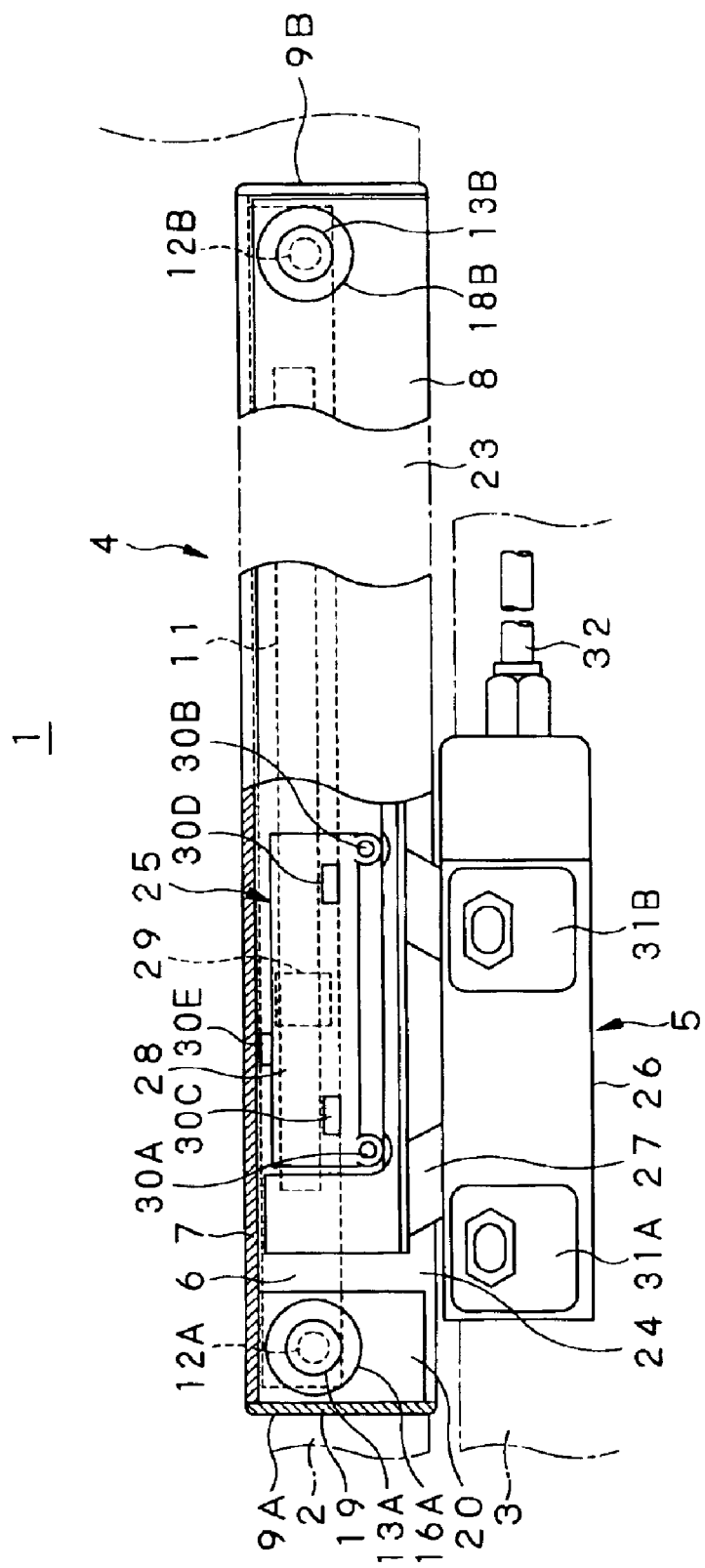
FIG. 2 is a partially fragmentary front view of the substantial part of a first embodiment of the scale device according to the present invention.
Figure 5:
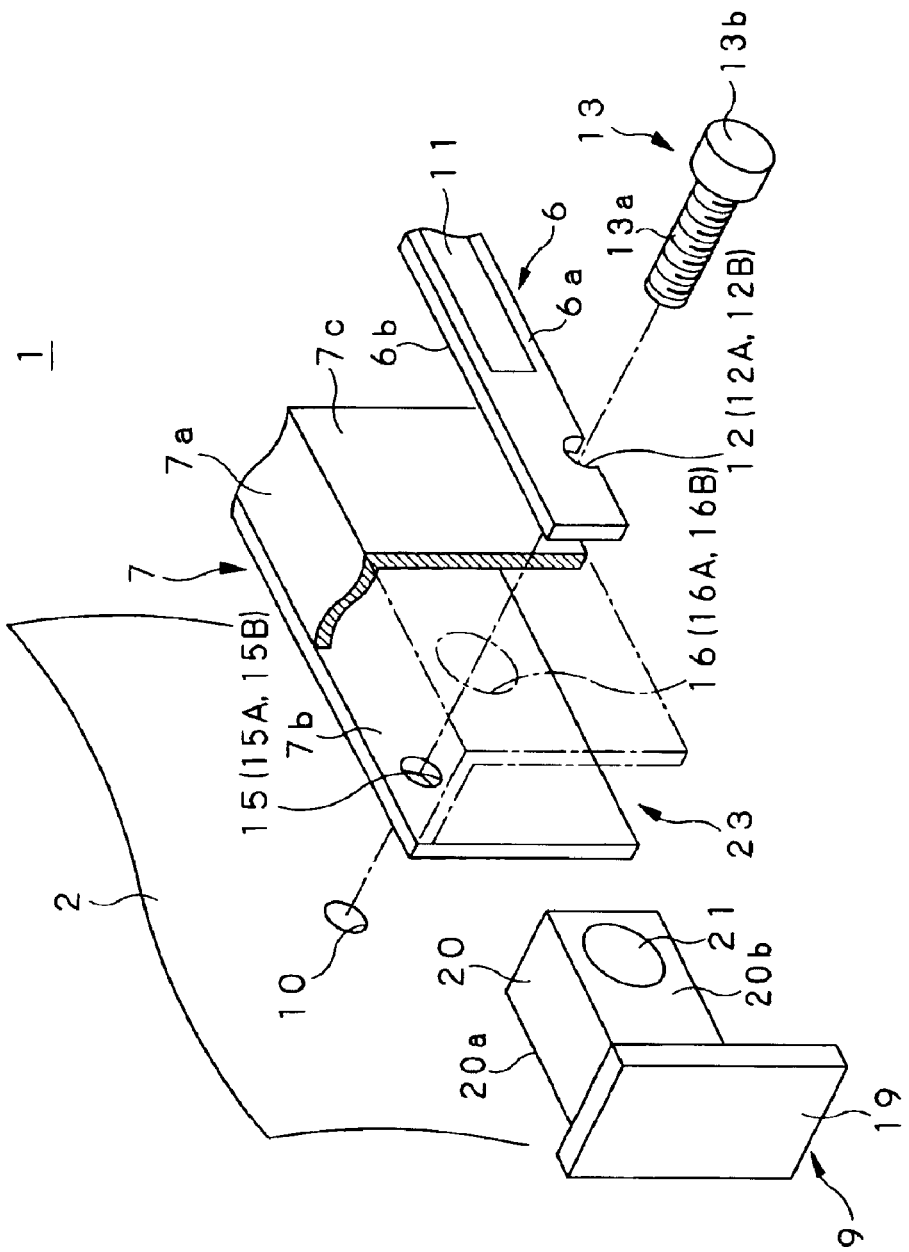
FIG. 5 is an exploded perspective view of the substantial part of the scale device in FIG. 2, explaining the installation of the scale unit to the stationary part of the machine.

Of the scale member 6, portions near longitudinal opposite end portions across the position signal carrying area 11 are formed as mounting portions which are fixed along with the first case member 7 to the stationary part 2 of the machine as will be described in detail later. In these mounting portions of the scale member 6, there are formed fixing holes 12A and 12B (will generically be called "fixing hole 12" hereunder wherever they may not be referred to individually) as shown in FIGS. 2 and 5. The fixing hole 12 is formed semi-circularly open at the lower edge of the scale member 6. The fixing hole 12 is to be opposite to the mounting bore 10 formed in the mounting portion of the stationary part 2 of the machine.

Note that the fixing hole 12 may be an opening through which there is inserted a thread portion 13a of a mounting screw 13 which is used for fixing the scale member 6 and first case member 7 to the stationary part 2 of the machine, and around which a head portion 13b of the screw 13 is engaged. Therefore, the opening may be a circularly or appropriately otherwise-shaped hole or a cut, for example. Alternatively, one of the fixing holes 12 may be circular while the other may be a cut or they may be elongated holes whose longitudinal directions are different from each other. In case the scale device 1 is long and fixed at a plurality of places with the mounting screw 13 driven in each of a plurality of mounting holes formed in the stationary part 2 of the machine, a corresponding plurality of fixing holes 12 may be formed in the scale member 6 opposing the mounting holes, respectively.

The scale member 6 is fixed at a second main side 6b thereof opposite to the first main side 6a to the inner surface of the first case member 7 by bonding with an adhesive 14. The first case member 7 is formed from a sheet of the same steel or stainless steel as the material of the stationary part 2 of the machine, for example. It includes a top portion 7a, and first and second lateral portions 7b and 7c opposite to each other and extending along opposite lateral edges, respectively, and also along the whole length, of the top portion 7a. The lateral portions 7b and 7c are formed integrally with the top portion 7a, respectively. Namely, the first case member 7 is open at the bottom and longitudinal opposite ends thereof. The first case member 7 is thus formed to have a generally U-shaped section open at the bottom. The first case member 7 is somewhat greater in total length than the mounting portion of the stationary part 2 of the machine. The first case member 7 is secure at the longitudinal end portions of the first and second lateral portions 7b and 7c thereof to the mounting portion of the machine. The longitudinal end portions are taken as first and second fixing portions at the scale device side.

The first case member 7 is secured at the first lateral portion 7b thereof to the stationary part 2 of the machine. In the first fixing portion of the first lateral portion 7b, there are formed fixing holes 15A and 15B (will generically be called "fixing hole 15" hereunder wherever they may not be referred to individually) opposing the mounting holes 10 formed a predetermined space away from each other in the stationary part 2 of the machine. As will further be described later, the fixing hole 15 is one through which the thread portion 13a of the mounting screw 13 is to be inserted when fixing the scale portion 4 to the stationary part 2 of the machine. With the scale member 6 being fixed, by bonding, to the first case member 7, the fixing hole 15 is coaxial, and communicates, with the aforementioned fixing hole 12. The fixing hole 15 has an inside diameter smaller than the outside diameter of the head portion 13b of the mounting screw 13.

Figure 4:
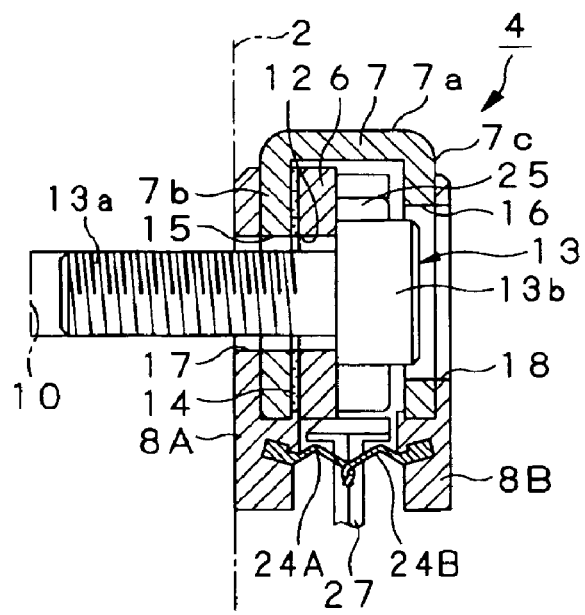
FIG. 4 is an axial sectional view of the substantial part of the scale device in FIG. 2 with the scale unit being mounted on a stationary part of a machine.

In the first case member 7, guide holes 16A and 16B (will generically be called "guide hole 16" hereunder wherever they may not be referred to individually) are formed in the second fixing portion of the second lateral portion 7c. The guide hole 16 is coaxially opposite to the fixing hole 15. As shown in FIGS. 4 and 5, the guide hole 16 is a circular hole larger in diameter than the fixing hole 15 and the head portion 13b of the mounting screw 13. With the scale member 6 being bonded to the first case member 7, the guide hole 16 is coaxially opposite to the fixing hole 12 in the scale member 6.

The first case member 7 has assembled to the first and second lateral portions 7b and 7c thereof a pair of second case members 8A and 8B, respectively. The second case member 8 is a generally plate-like structure formed from the same material such as steel, stainless steel or the like as the material of the first case member 7 or from a resin sheet. It is nearly as long as, and higher than, the first case member 7. As shown in FIG. 3, the second case member 8 has an inwardly thicker or stepped lower end portion formed to extend along the full length and downward from a position corresponding to the lower end of the first case member 7. Namely, the second case member 8 is bonded to the outer surface of the first case member 7 to support the lower end of the first case member 7 along the full length.

One of the second case members, 8A, has formed therein a guide hole 17 corresponding, and near equal in diameter, to the fixing hole 15 in the first case member 7 as shown in FIG. 4. The thread portion 13a of the mounting screw 13 inserted through the guide hole 17 when installing the scale member 4 to the stationary part 2 of the machine. Also, the other second case member 8B has formed therein a guide hole 18 corresponding, and nearly equal in diameter, to the guide hole 16 in the first case member 7. The thread portion 13b of the mounting screw 13 is inserted through the guide hole 18.

The first case member 7 has a side case member 9 fitted in either longitudinal open ends thereof. The side case member 9 is formed from a sheet of the same steel, stainless steel or the like as the material of the first case member 7 or from a resin sheet. As shown in FIG. 5, the side case member 9 includes a plate-like base portion 19 having a generally same profile as the end opening of the first case member 7, and a spacer portion 20 formed integrally on, and as a projection from, the inner surface of the base portion 19. The spacer portion 20 has a thickness nearly equal to, or somewhat smaller than, a difference between the thickness of the scale member 6 and the space between the inner surfaces of the first and second lateral portions 7b and 7c of the first case member 7.

The side case member 9 has formed through the spacer portion 20 thereof a guide hole 21 which is to be placed coaxially with the fixing hole 15 and guide hole 16 formed in the first case member 7 when the side case 9 is fitted in the first case member 7 as will further be described later. The guide hole 21 has an inside diameter larger than the outside diameter of the thread portion 13b of the mounting screw 13 and thus permits the mounting screw 13 to extend through the guide hole 21 when the scale unit 4 is installed to the stationary part 2 of the machine.

The side case member 9 is assembled to the first case member 7 with the spacer portion 20 thereof being inserted between the first main side 6a of the scale member 6 bonded to the first lateral portion 7b, and the second lateral portion 7c, of the first case member 7. In this assembled state, the side case member 9 has a first lateral side 20a of the spacer portion 20 thereof put in contact with the first main side 6a of the scale member 6, and a second lateral side 20b put in contact with the inner surface of the second lateral portion 7c of the first case member 7. The side case member 9 thus closes the longitudinal open ends of the first and second case members 7 and 8, and maintains, by the spacer portion 20 thereof, a space between the scale member 6 bonded to the inner surface of the first lateral portion 7b, and the second lateral portion 7c, of the first case member 7.

In the scale unit 4, the bottom opening of the first case member 7 provides a sliding guide opening 23 in which the detector 5, moving as the moving part 3 of the machine moves, will slide in relation to, and along, the scale unit 4. As shown in FIGS. 3 and 4, the second case member 8 has seal lip members 24A and 24B (will generically be called "seal lip member 24" hereunder wherever they may not be referred to individually) fixed in the lower portions of the second case members 8A and 8B, respectively, projecting downward from the lower ends of the first and second lateral portions 7b and 7c, defining together the sliding guide opening 23, of the first case member 7. The seal lip members 24 prevent dust or the like from entering the inner space of the first case member 7.

The seal lip member is formed from a thin sheet of an elastic material such as rubber fluoride, polyurethane resin or the like. As shown, the seal lip members 24 are fixed at the base portions thereof in fixing recesses, respectively, formed in the second case members 8A and 8B along the full length of the sliding guide opening 23 defined between the lower ends of the first and second lateral portions 7b and 7c of the first case member 7, which will not be explained in detail herein. The seal lip members 24 are in elastic contact at the free ends thereof with each other to close the sliding guide opening 23 along the full length.

The scale member 6 of the scale unit 4 constructed as above is fixed at the second main side 6b thereof to the inner surface of the first lateral portion 7b of the first case member 7 by bonding with the adhesive 14. With a predetermined amount of adhesive 14 applied over the second main side 6b, the scale member 6 is securely fixed, by bonding, to the first lateral portion 7b of the first case member 7 with the fixing hole 12 in the scale member 6 being positioned to communicate with the fixing hole 15 formed in the first lateral portion of the first case member 7 correspondingly to the fixing hole 12. The scale member 6 is fixed, by bonding with the adhesive 14 which is not elastic when cured, namely, which is resistant against elastic deformation, such as epoxy adhesive, for mechanical integration with the first case member 7. It should be noted that the adhesive 14 may be an one containing, as base, an appropriate resin such as acrylic resin or urethane resin, or containing metal powder.

As shown in FIG. 4, the scale unit 4 is installed, at the first lateral portion 7b of the first case member 7, to the stationary part 2 of the machine with the mounting screw 13. When installing the scale unit 4 to the stationary part 2 of the machine, the first case member 7 is applied to the stationary part 2 with the mounting bore 10 in the stationary part 2 being placed for alignment with the corresponding fixing hole 15 in the first case member 7. Then, the mounting screw 13 is introduced from the guide hole 16 in the second lateral portion 7c of the first case member 7. With the thread portion 13a of the mounting screw 13 being inserted through the fixing hole 12 in the scale member 6, fixing hole 15 in the first case member 7 and guide hole 17 in the second case member 8, and then driven into the mounting bore 10 in the stationary part 2 of the machine, the scale unit 4 is fixed to the stationary part 2 of the machine.

As shown in FIG. 4, the mounting screw 13 is engaged at the head portion 13b thereof around the opening edge of the fixing hole 12 in the scale member 6, and driven at the thread portion 13a thereof into the mounting bore 10 in the stationary part 2 of the machine. Thus, the mounting screw 13 fastens, at the head portion 13b thereof, the second case member 8, first lateral portion 7b of the first case member 7 and the scale member 6 together to the mounting portion of the stationary part 2 of the machine. Therefore, the scale unit 4 has the scale member 6 thereof fastened with the mounting screw 13 to the first case member 7 which is to be fixed to the stationary part 2 of the machine, and thus it will be integral with the stationary part 2 of the machine.

As above, the scale member 6 of the scale unit 4, first case member 7 and stationary part 2, formed from materials different in linear expansion coefficient from each other, will be mechanically integral with one another. So, these members are limited from freely being changed in dimensions depending upon environmental conditions, and the dimensional changes they incur will be nearly equal to each other. Thus, the scale unit 4 can have the scale member 6 thereof fixed via the first case member 7 to the stationary part 2 of the machine with a high precision.

Note that although a casing is made for the scale unit 4 by combining the first case member 7, in which the scale member 6 is housed and fixed and which is used as a member for installation to the stationary part 2 of the machine, with the second case member 8 and side case member 9 as mentioned above, it is of course that the present invention is not limited to this construction. The casing for the scale unit 4 may be constructed from an integration of the first and second case members 7 and 8, for example. Alternatively, such a casing may be formed by forming the second case member 8 which has also the function of the side case member 9, for example.

As shown in FIGS. 2 and 3, the detector 5 includes a sensor unit 25, a carrier unit 26, a coupling member 27 etc. which provides a coupling between these sensor unit 25 and a carrier unit 26. When the carrier unit 26 of the detector 5 is mounted on the moving part 3 of the machine as will be described in detail later, the sensor unit 25 of the detector 5 is positioned into place, via the sliding guide opening 23, inside the first case member 7 of the scale unit 4 fixed to the stationary part 2 of the machine as shown in FIG. 3. As the moving part 3 of the machine moves in relation to the stationary part 2, the sensor unit 25 of the detector 5 is guided by the scale member 6 to slide, detects the position signals provided on the position signal carrying area 11, and provides a detection signal as an output.

The sensor unit 25 includes a base member 28 opposite and parallel to the first main side 6a of the scale member 6, a sensor 29 mounted via a sensor mount member on the base member 28, a bearing mechanism composed of a plurality of guide rollers 30A to 30E (will generically be called "guide roller 30" hereunder wherever they may not be referred to individually), etc. The sensor unit 25 is positioned and supported, with a high precision, by the guide roller 30 for the sensor 29 to be held a predetermined space off the first main side 6a of the scale member 6. As the guide roller 30 rolls while being forced by a spring member to the first main side 6a and lower edge of the scale member 6, which will not be described in detail herein, the sensor unit 25 is slid smoothly without pitching, rolling or otherwise moving the scale member 6.

Of the sensor unit 25, the sensor 29 is electrically connected by a flexible cable (not shown) to an electric circuit inside the carrier unit 26 (NOTE: the carrier unit and the electric circuit will be referred to as "carrier unit 26" hereunder), and sends a detection signal that has detected a position signal, as an output, to the carrier unit 26. The carrier unit 26 has mounting portions 31A and 31B (will generically be called "mounting portion 31" hereunder wherever they may not be referred to individually) provided away longitudinally thereof from each other. The mounting portion 31 is shaped like a box having a fixing hole formed therein, which will not be described in detail herein. The carrier unit 26 is fixed with a mounting screw to the moving part 3 of the machine, and slides along with the moving part 3 of the machine. To the carrier unit 26, there is connected a cable 32 connected to the controller and display unit (not shown) of the machine and through which a detection signal that the sensor 29 has detected a position signal is supplied as an output to the controller and display unit of the machine.

The coupling member 27 is shaped like a plate (not shown in detail). It couples the sensor unit 25 housed into the first case member 7 via the sliding guide opening 23 with the carrier unit 26 fixed to the moving part 3 of the machine. The coupling member 27 has a portion to be placed in the sliding guide opening 23. This portion is shaped to have a generally boat-shaped section. Namely, the portion is gradually reduced in thickness in the longitudinal direction from the middle toward opposite ends thereof. The seal lip members 24 being elastically deformed are in contact, along the full length, with the above portion of the coupling member 27 staying in the sliding guide opening 23, as shown in FIG. 3. Therefore, in the scale device 1, the slide guide opening 23 is thus held closed also when the detector 5 is sliding relative to the scale unit 4.

In the scale device 1 constructed as above, as the moving part 3 of the machine moves in relation to the stationary part 2 when the machine is in operation, the carrier unit 26 slides together with the moving part 3 of the machine along the first case member 7. As the carrier unit 26 thus slides, the sensor unit 25 will be guided by the scale member 6 to slide in the inner space of the first case member 7 by means of the coupling member 27. The sensor 29 mounted on the sensor unit 25 scans the position signal carrying area 11 on the scale member 6 and detects a position signal there. The sensor 29 provides the detection output to the carrier unit 26, and the detection signal is supplied to the controller and display unit of the machine through the cable 32.

In the scale device 1, the scale member 6 of the scale unit 4 is fixed to the first case member 7 by bonding with the adhesive 14, and also along with the first case member 7 to the stationary part 2 of the machine with the mounting screw 13. Since the dimensional change of the scale member 6 depending upon environmental conditions is nearly equal to that of the stationary part 2 of the machine with which the scale member 6 is mechanically integral, the position signals provided in the position signal carrying area 11 can be maintained constant in precision. Also, since the detector 5 is installed to the moving part 3 of the machine, formed from the same material as that of the stationary part 2, the sensor 29 of the detector 5 and the scale member 6 are held positioned relative to each other. Thus, the scale device 1 can measure travels of the stationary and moving parts 2 and 3 of the machine in relation to each other with a high accuracy.

In the aforementioned scale device 1, the scale member 6 is fixed to the inner surface of the first main side 7b of the first case member 7 by bonding with the adhesive 14 applied to the second main side 6b thereof. So, in a place where the scale member 6 and first case member 7 are fastened together by the mounting screw 13, there will arise a clearance corresponding to the layer thickness of the adhesive 14. Therefore, excessive tightening of the mounting screw 13 will possibly cause the scale member 6 to be deflected, which will result in no high-precision installation.

Figure 6:
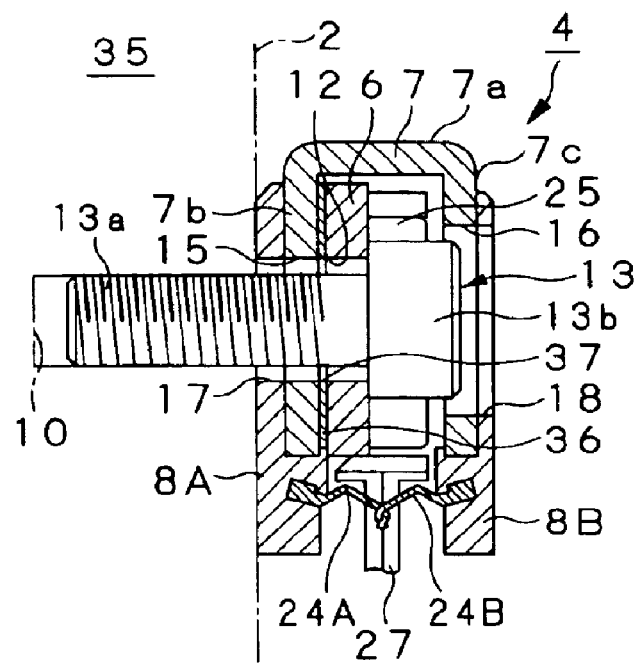
FIG. 6 is an axial sectional view of the substantial part of a second embodiment of the scale device according to the present invention, with the scale unit being mounted on a stationary part of the machine.
Figure 7:
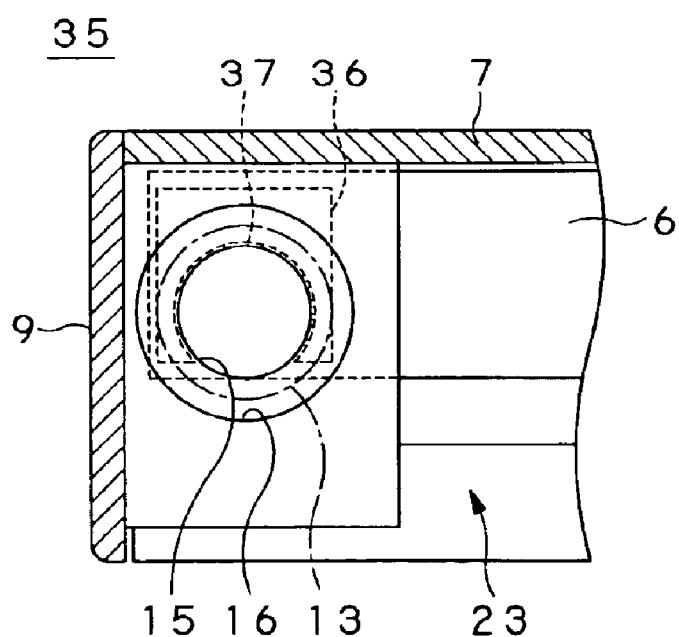
FIG. 7 is a partially fragmentary front view of the scale device in FIG. 6, explaining the installation of the scale unit to the stationary part of the machine.
Figure 8:
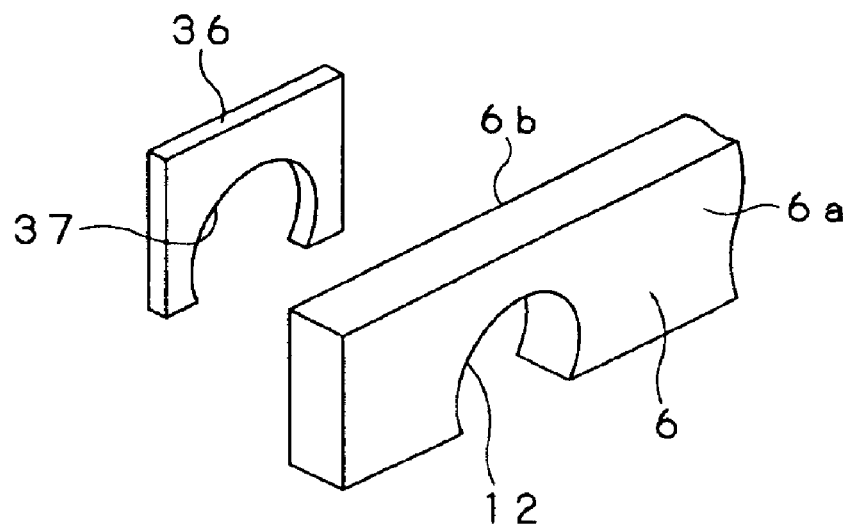
FIG. 8 is an exploded perspective view of the substantial part of the scale device in FIG. 6, explaining the structure of the scale member and spacer member.

FIGS. 6 to 8 show together the second embodiment of the scale device according to the present invention. The scale device, generally indicated with a reference number 35, includes a spacer member 36 to prevent such a deflection of the scale member 6. The spacer member 36 is placed between the scale member 6 and first case member 7 which are to be fastened together by the mounting screw 13. It should be noted that since the scale device 35 is similar in construction to the scale device 1 except for the spacer member 36, the same parts and members as those in the scale device 1 will be indicated with the same reference numbers as in FIGS. 2 to 5 and will not be described in detail any longer.

The spacer member 36 is formed from a stainless steel sheet, for example. It is shaped as a rectangular piece having nearly the same thickness of the adhesive 14 and of which each side has a length somewhat smaller than the width of the scale member 6. The spacer member 36 has formed therein a fixing hole 37 whose diameter is the same as that of the fixing hole 12 formed in the scale member 6 and which is open at the circumferential bottom thereof. Namely, the fixing hole 37 is semicircular as shown in FIG. 8. It should be noted that the fixing hole 37 may be larger in diameter than the fixing hole 12 so long as it is an opening through which the thread portion 13a of the mounting screw 13 can be inserted, and it may also be a hole having any other shape, circular or appropriately otherwise-shaped, or a cut, correspondingly to the shape of the fixing hole 12, for example.

In the scale device 35, the spacer member 36 is interposed between the second main side 6b of the scale member 6 and the inner surface of the first lateral portion 7b of the first case member 7 with the fixing hole 37 being axially aligned with the fixing holes 12 and 15 as shown in FIGS. 6 and 7. The mounting screw 13 is introduced from the guide hole 16 in the first case member 7, and has the thread portion 13a thereof inserted through the fixing hole 12 in the scale member 6, fixing hole 37 in the spacer member 36, fixing hole 15 in the first case member 7 and guide hole 17 in the second case member 8 in this order, and then driven into the mounting bore 10 in the stationary part 2 of the machine.

By tightening the mounting screw 13 with the spacer member 36 being interposed between the scale member 6 and first case member 7, the second case member 8, first case member 7 and scale member 6 are fastened together and fixed to the stationary part 2 of the machine. Thus, since the mounting screw 13 is tightened with absorption, by the interposed spacer member 36, of any spacing, caused by the layer thickness of the adhesive 14, between the scale member 6 and first case member 7, it is possible to prevent the scale member 6 from being deflected. It should be noted that in the scale device 35, the spacer member 36 may be fixed to the scale member 6 in advance by bonding with the adhesive 14.

In the scale device 35, the plate-shaped spacer member 36 is interposed between the scale member 6 and first case member 7. However, if the spacer member 36 is not in place during installation, the fixing holes 12 and 15 will not possibly be aligned with the fixing hole 37. In such an event, the mounting screw 13 cannot be inserted through these holes and the spacer member 36 has to be repositioned.

Figure 9:
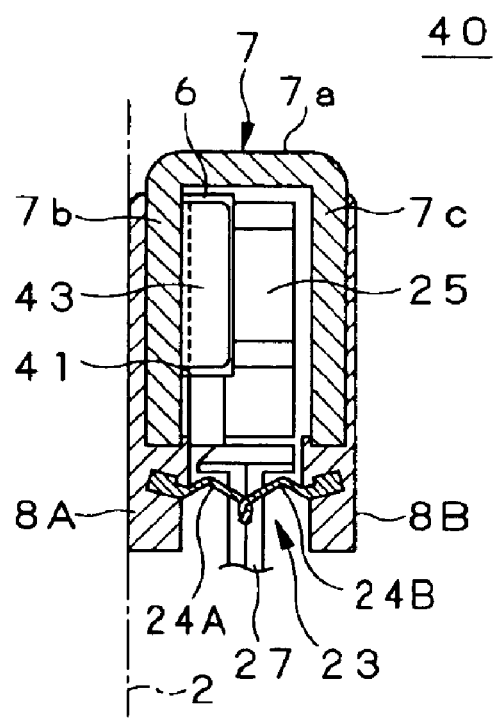
FIG. 9 is an axial sectional view of the substantial part of a third embodiment of the scale device according to the present invention, showing the construction of the scale unit.
Figure 10:
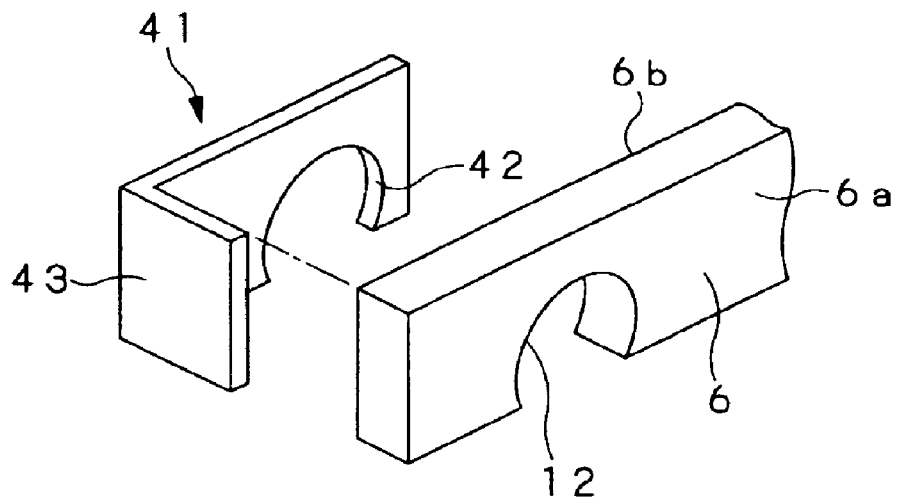
FIG. 10 is an exploded perspective view of the substantial part of the scale device in FIG. 9, explaining the structure of the scale member and spacer member.

FIGS. 9 and 10 show together the third embodiment of the scale device according to the present invention. The scale device, generally indicated with a reference number 40, includes a spacer member 41 having a function of misalignment prevention. The spacer member 41 is interposed in a position where the scale member 6 and first case member 7 are fastened together. It should be noted that since the scale device 40 is similar in construction to the scale device 1 except for the spacer member 41, the same parts and members as those in the scale device 1 will be indicated with the same reference numbers as in FIGS. 2 to 5 and will not be described in detail any longer.

The above-mentioned spacer member 41 is also formed from a stainless steel sheet, for example. It is shaped as a rectangular piece having nearly the same thickness as the layer thickness of the adhesive 14 and of which each side has a length somewhat smaller than the width of the scale member 6. The space member 41 has formed therein a fixing hole 42 whose diameter is equal to or somewhat larger than that of the fixing hole 12 formed in the scale member 6. As shown in FIG. 10, the fixing hole 42 is open at the circumferential bottom thereof. Namely, it is semicircular. As shown in FIG. 10, the spacer member 41 has a stopper portion 43 formed integrally at one end thereof and perpendicularly to the main side. The distance of the stopper portion 43 from the fixing hole 42 is generally equal to the distance of the longitudinal end of the scale member 6 from the fixing hole 12 in the scale member 6. It should be noted that the spacer member 41 is fitted to each of the longitudinal ends of the scale member 6. Namely, the spacer members 41 are symmetrically with each other.

In the scale device 40, the spacer member 41 is interposed between the second main side 6b of the scale member 6 and inner surface of the first lateral portion 7b of the first case member 7 as shown in FIG. 9. The space member 41 is so interposed with the fixing hole 42 being axially aligned with the fixing hole 12 in the scale member 6 and fixing hole 15 in the first case member 7 as well as with the stopper portion 43 being placed between the longitudinal end of the scale member 6 and base portion 19 of the side case member 9. In the scale device 40, the spacer member 41 is prevented from being misaligned because the stopper portion 43 is caught between the longitudinal end of the scale member 6 and base portion 19 of the side case member 9, and thus the holes can be kept axially aligned with each other.

In the scale device 40, the mounting screw 13 is introduced from the guide hole 16 in the first case member 7, and has the thread portion 13a thereof extending through the fixing hole 12 in the scale member 6, fixing hole 42 in the spacer member 41, fixing hole 15 in the first case member 7 and the guide hole 17 in the second case member 8 and then driven into the mounting bore 10 in the stationary part 2 of the machine. By tightening the mounting screw 13 with the spacer member 41 being interposed between the scale member 6 and first case member 7, the second case member 8, first case member 7 and scale member 6 are fastened together and fixed to the stationary part 2 of the machine. Thus, since the mounting screw 10 is tightened with absorption, by the interposed spacer member 41, of any spacing, caused by the layer thickness of the adhesive 14, between the scale member 6 and first case member 7, the scale member 6 can be prevented from being deflected.

Figure 11:
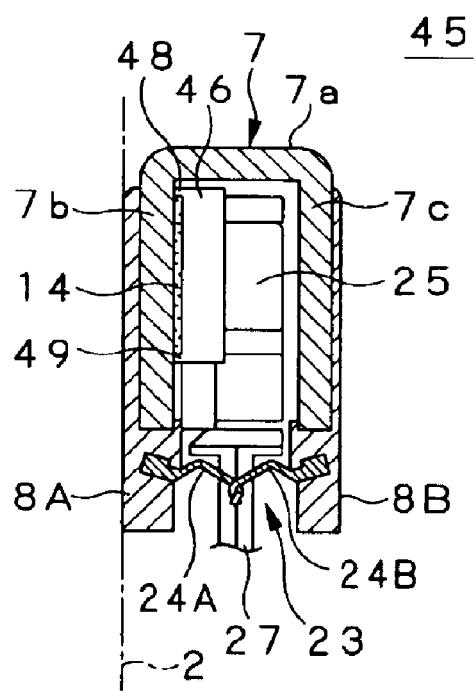
FIG. 11 is an axial sectional view of the substantial part of a fourth embodiment of the scale device according to the present invention, showing the construction of the scale unit.
Figure 12:
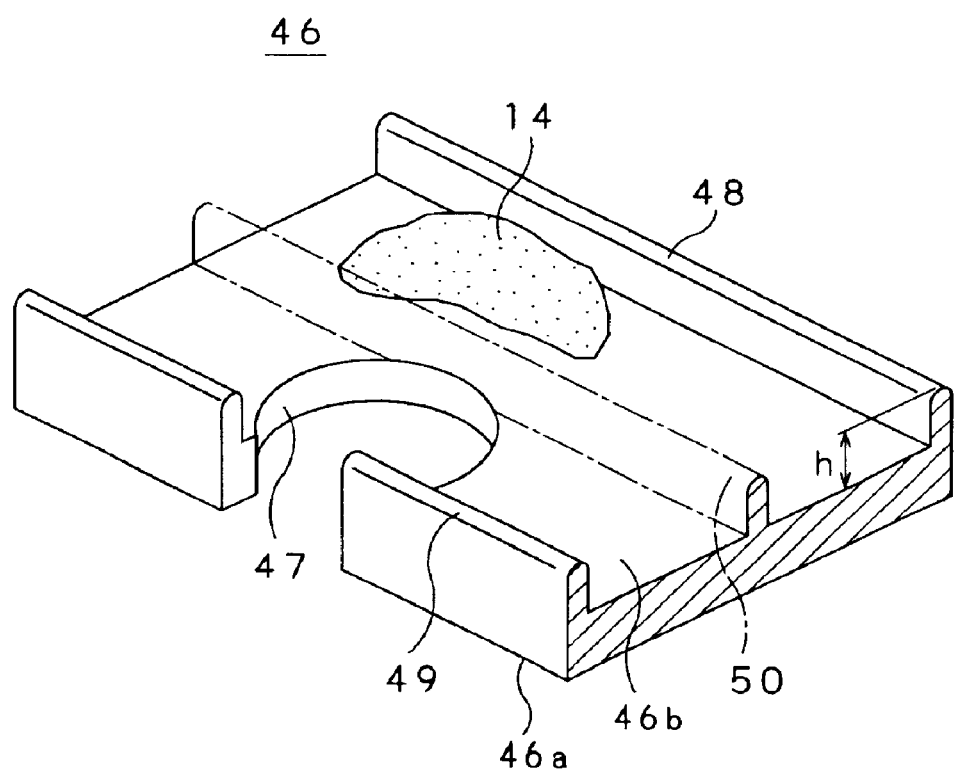
FIG. 12 is a perspective view of the substantial view of the scale device in FIG. 11, explaining the construction of the second main side of the scale member.

FIGS. 11 and 12 show together the fourth embodiment of the scale device according to the present invention. The scale device, generally indicated with a reference number 45, includes a scale member 46 which can control the layer thickness of the adhesive 14 to a constant amount. It should be noted that since the scale device 45 is similar in construction to the scale device 1 except for the scale member 46, the same parts and members as those in the scale device 1 will be indicated with the same reference numbers as in FIGS. 2 to 5 and will not be described in detail any longer.

The scale member 46 is also formed from an aluminum alloy for extrusion, for example. It is a rectangular plate somewhat longer than the distance between scale mounting portions provided a predetermined distance between them on the stationary part 2 of the machine. The scale member 46 has the position signal carrying area 11 (equivalent to that in the scale device 1 ) provided on the first main side 46a thereof. Also, the scale member 46 has longitudinal opposing end portions thereof, across the position signal carrying area 11, as mounting portions, and it is fixed at the mounting portions to the stationary part 2 of the machine along with the first case member 7. A fixing hole 47 is formed in each of the mounting portions. As shown in FIG. 12, the fixing hole 47 is also open at the circumferential bottom thereof, namely, it is semicircular. The fixing hole 47 is to be opposite to the mounting bore 10 in the mounting portion of the stationary part 2 of the machine. It should be noted that the fixing hole 47 may also be circular or any appropriately otherwise-shaped hole or a cut.

As shown in FIG. 11, the scale member 46 is fixed at the second main side 46b thereof opposite to a first main side 46a to the inner surface of the first case member 7 by bonding with the adhesive 14. The scale member 46 has first and second, opposing rib-shaped projections 48 and 49 formed integrally on the second main side 46b thereof along longitudinal opposite edges and full length as shown in FIG. 12. The first and second rib-shaped projections 48 and 49 are formed integrally on the second main side 46b during extrusion molding of the scale member 46. They have a predetermined heigh h which defines the layer thickness of the adhesive 14 applied to the scale member 46.

As shown in FIG. 12, the scale member 46 is applied at the second main side 46b thereof with a predetermined amount of the adhesive 14 which is fluid. When the scale member 46 is pressed to the first case member 7, the adhesive 14 will be spread in all directions on the second main side 46b and stopped by the first and second rib-shaped projections 48 and 49 from spreading any more. Thus, the adhesive 14 forms, on the second main side 46b of the scale member 46, an adhesive layer whose thickness depends upon the predetermined height h of the first and second rib-shaped projections 48 and 49.

In the scale device 45 constructed as above, the scale member 46 and first case member 7 are bonded at the entire adjacent surfaces thereof to each other with the adhesive 14 having a uniform layer thickness. So, the thermal stress between the scale member 46 and first case member 7, caused by ambient environmental conditions, will be uniform over their adjacent surfaces. Therefore, in the scale device 45, since partial strain of the adhesive 14, caused by a thermal stress due to nonuniform layer thickness, can be suppressed, the scale member 46 fastened at opposite end portions thereof to the first case member 7 can be fixed, by bonding, along the full length thereof with a high precision.

Also in the scale device 45, since the scale member 46 is bonded to the inner surface of the first case member 7 with the first and second rib-shaped projections 48 and 49 being in contact with the inner surface, the bonding can be made with an improved precision as compared with that in the structure in which the scale member is bonded at the entire surface thereof to the first case member. Also, since the first and second rib-shaped projections 48 and 49 are formed along the opposing longitudinal edges of the second main side 46b of the scale member 46, the scale member 46 can precisely be bonded to the first case member 7 with limitation of the inclination thereof in the width direction.

Note that although in the scale device 45, the first and second rib-shaped projections 48 and 49 are formed along the longitudinal opposing edges on the second main side 46b of the scale member 46, the present invention is not limited to such a structure. In the scale member 46, each of the first and second rib-shaped projections 48 and 49 may be formed from a plurality of convexities, for example. Also in the scale member 46, a third rib-shaped projection 50, indicated with a dot-dashed line in FIG. 12, may be formed integrally on the second main side 46b of the scale member 46 in addition to the first and second rib-shaped projections 48 and 49. Also, the third rib-shaped projection 50 may be so formed instead of the first and second rib-shaped projections 48 and 49. The third rib-shaped projection 50, formed adjacent to the position signal carrying area 11, will improve the mechanical strength of the position signal carrying area 11 which will thus be prevented from being deflected or otherwise influenced.

In the aforementioned scale device 1, the scale member 6 and first case member 7 are fastened together and fixed to the stationary part 2 of the machine with the mounting screw 13 having the large-diameter head portion 13b. In the scale device 1, the head portion 13b of the mounting screw 13 is applied directly to the scale member 6 around the fixing hole 12. Therefore, when the mounting screw 13 is tightened strongly, the head portion 13b thereof will apply a large running torque to the scale member 6 which will thus be likely to be deflected or otherwise influenced.

Figure 13:
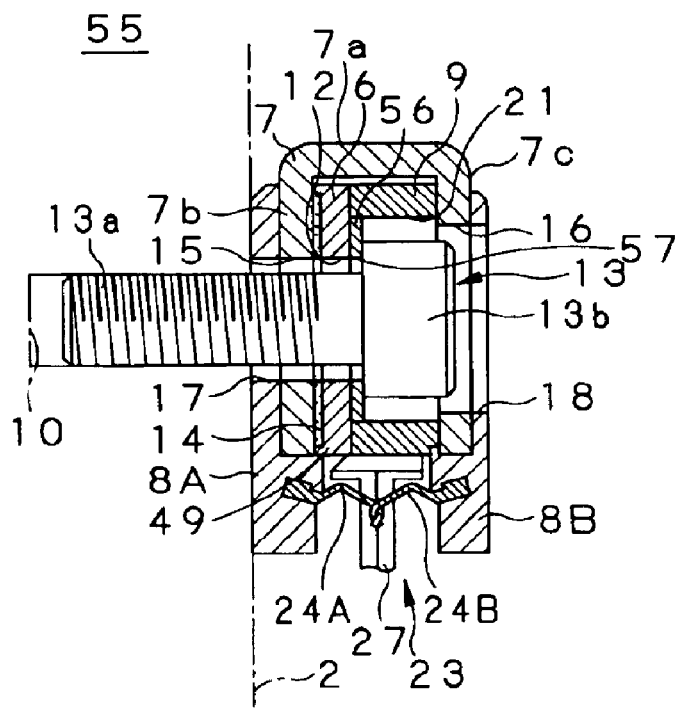
FIG. 13 is an axial sectional view of the substantial part of a fifth embodiment of the scale device according to the present invention, with the scale unit being mounted on the stationary part of the machine.
Figure 14:
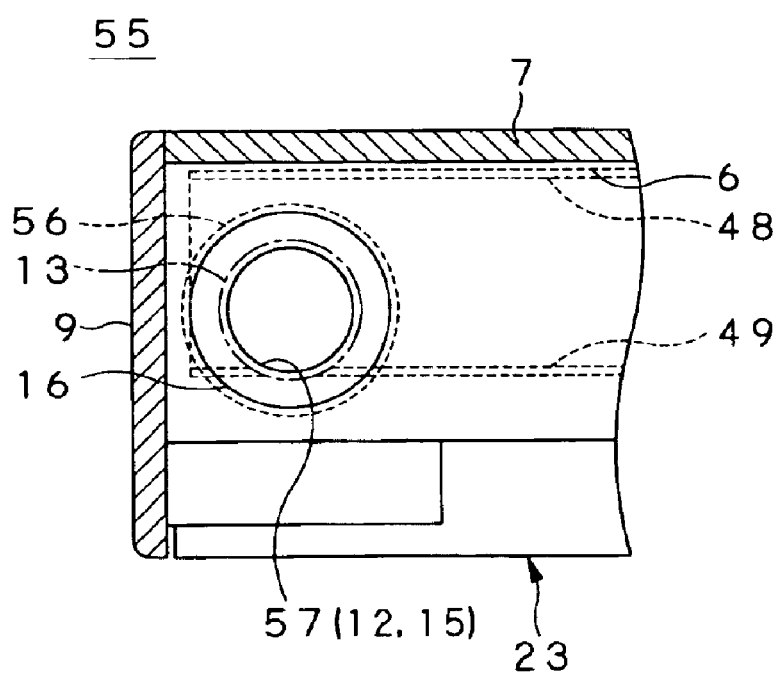
FIG. 14 is a partially fragmentary front view of the substantial part of the scale device in FIG. 13, explaining the installation of the scale unit to the stationary part of the machine.

FIGS. 13 and 14 show together the fifth embodiment of the scale device according to the present invention. The scale device, generally indicated with a reference number 55, includes a washer member 56 provided on the thread portion 13a of the mounting screw 13 and between the scale member 6 and head portion 13b of the mounting screw 13. It should be noted that since the scale device 55 is similar in construction to the scale device 1 except for the washer member 56, the same parts and members as those in the scale device 1 will be indicated with the same reference numbers as in FIGS. 2 to 5 and will not be described in detail any longer.

The washer member 56 is formed from stainless steel to have an annular shape. The washer member 56 has formed therein a fixing hole 57 whose inside diameter is larger than the outside diameter of the thread portion 13a of the mounting screw 13 and smaller than the outside diameter of the head portion 13b, as shown in FIG. 13. It has an outside diameter larger than the inside diameter of the fixing hole 12 in the scale member 6 and the inside diameter of the guide hole 16 in the first case member 7. The washer member 56 is inserted in the guide hole 21 formed in the side case member 9. It should be noted that in the side case member 9, the guide hole 21 is formed to have an inside diameter larger than the inside diameters of the fixing hole 15 and guide hole 16 in the first case member 7. The inside diameter of the guide hole 21 is large enough to allow the washer member 56 to penetrate through the guide hole 21.

In the scale device 55, the side case member 9 is assembled to the first case member 7 having the scale member 6 bonded thereto with the washer member 56 being fitted in the guide hole 21. Also, the aforementioned washer member 56 is larger in diameter than the fixing hole 15 and guide hole 16 in the first case member 7. So, with the side case member 9 assembled to the fist case member 7, the washer member 56 is engaged on the opening edge of the guide hole 16 and will thus not fall. The washer member 56 is kept fitted inside the guide hole 21 in the side case member 9, which will increase the efficiency of installing work.

In the scale device 55, the washer member 56 is applied to the first main side 6a of the scale member 6 at the bottom of the guide hole 21 in the side case member 9 with the side case member 9 being assembled to the first case member 7. At this time, the washer member 56 has the fixing hole 57 axially aligned with the fixing hole 15 and guide hole 16 in the first case member 7 and fixing hole 12 in the scale member 6 as shown in FIGS. 13 and 14. The mounting screw 13 introduced from the guide hole 16 in the first case member 7 has the thread portion 13a thereof inserted through the fixing hole 57 in the washer member 56. With the thread portion 13a of the mounting screw 13 being inserted through the fixing hole 57 in the washer member 56, fixing hole 12 in the scale member 6 and fixing hole 15 in the first case member 7 and then driven into the mounting bore 10 in the stationary part 2 of the machine, the washer member 56, scale member 6 and first case member 7 are fastened together.

In the scale member 55, since the washer member 56 is interposed between the scale member 6 and the head portion 13b of the mounting screw 13, the running torque from the mounting screw 13 will act on the washer member 56. Since the load from the mounting screw 13 to the scale member 6 acts in the direction in which the scale member 6 is forced to the first case member 7, the scale member 6 is prevented from being deflected or otherwise influenced. Since the outside diameter of the washer member 56 is larger than that of the guide hole 16 formed in the first case member 7, through which the mounting screw 13 is inserted, the washer member 56 is prevented from falling down from the guide hole 16 during installation of the scale device 55 to the machine. Namely, the scale device 55 can be installed to the machine with an improved efficiency.

Figure 15:
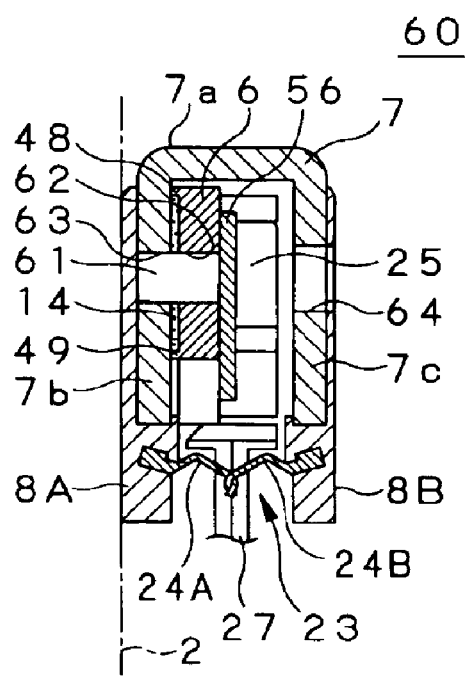
FIG. 15 is an axial sectional view of the substantial part of a sixth embodiment of the scale device according to the present invention, explaining the construction of the scale unit.
Figure 16:
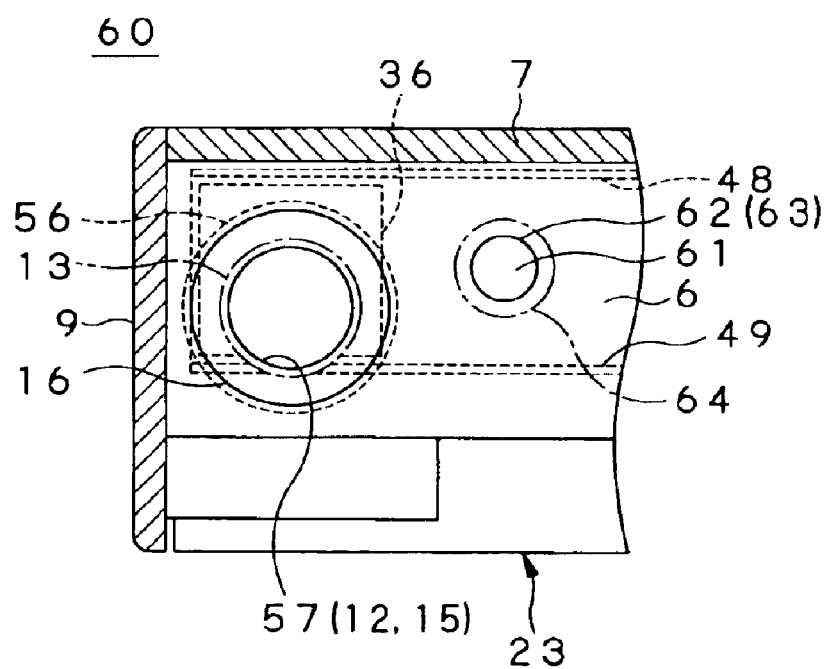
FIG. 16 is a partially fragmentary front view of the scale device in FIG. 15, explaining the installation of the scale unit to the stationary part of the machine.

FIGS. 15 and 16 show together the sixth embodiment of the scale device according to the present invention. The scale device, generally indicated with a reference number 60, includes a knock-pin 61 in addition to the mounting screw 13 which fastens the scale member 6 and first case member 7 together. The knock-pin 61 is provided to fix the scale member 6 and first case member 7 more securely. It should be noted that since the scale device 60 is similar in construction to each of the aforementioned scale devices except for the knock-pin 61, the same parts and members as those in the aforementioned scale devices will be indicated with the same reference numbers as in FIGS. 2 to 14 and will not be described in detail any longer.

As shown in FIG. 16, the scale member 6 has first calking hole 62 formed between the fixing hole 12 and position signal carrying area 11. In the scale member 6, there are formed the first calking holes 62 in pair across the position signal carrying area 11, but a calking hole 62 may be provided only at any side of the position signal carrying area 11. Also, a second calking hole 63 is formed along with the fixing hole 15 in the first lateral portion 7b of the first scale member 7 adjacent to the first calking hole 62 in the scale member 6. The distance between the second cawing hole 63 and fixing hole 15 in the first case member 7 is almost equal to that between the fixing hole 12 in the scale member 6 and first calking hole 62 in the scale member 6. Thus, the first and second calking holes 62 and 63 are in pair with each other. In addition, the first case member 7 has a large-diameter guide hole 64 formed in the second lateral portion 7c adjacent to the second calking hole 63.

In the scale device 60, when the scale member 6 is bonded to the inner surface of the first case member 7 for the fixing hole 12 to communicate with the fixing hole 15, the first calking hole 62 in the scale member 6 will communicate with the second calking hole 63 in the first case member 7. With the knock-pin 61 introduced from the guide hole 64 in the first case member 7 into the first and second calking holes 62 and 63 which will thus communicate with each other, the scale member 6 will securely be fixed to the first case member 7 as shown in FIG. 15. It should be noted that in the scale device 60, the end face of the knock-pin 61 is made even with the first main side 6a of the scale member 6 such that the sensor unit 25 can smoothly slide.

In the foregoing, the present invention has been described in detail concerning certain preferred embodiments thereof as examples with reference to the accompanying drawings. However, it should be understood by those ordinarily skilled in the art that the present invention is not limited to the embodiments but can be modified in various manners, constructed alternatively or embodied in various other forms without departing from the scope and spirit thereof as set forth and defined in the appended claims.

For example, the aforementioned knock-pin 61 may be formed as an inwardly projecting nib by embossing the first lateral portion 7b of the first case member 7, and the nib be force-fitted into the first calking hole 62 in the scale member 6. The knock-pin 61 and calking holes 62 and 63 are not limited to a circular shape but may be formed to have any appropriate other shape.

As having been described in the foregoing, the scale device according to the present invention as constructed such that the scale member of the scale unit is secured with the fastening member to the case member and then installed to the first part of the machine. So, even if the scale member is different in linear expansion coefficient from the mounting part of the machine where the case member or scale unit and detector are installed, the free dimensional change thereof due to environmental conditions is limited to be generally equal to the dimensional change of the mounting part of the machine, whereby the scale device can be installed to the machine with a high precision. Therefore, the scale member according to the present invention can measure travels of the first and second parts of the machine in relation to each other with a high accuracy.

What is claimed is:

1. A scale device comprising:
   a scale unit including:
      a scale member formed from a long member having a position signal region and at least a pair of fixing holes arranged longitudinally and on both sides of said position signal region; and
      a case member having at least a pair of fixing holes arranged longitudinally and through each of which a fastening member is inserted and screwed into a mounting hole formed in a first part of a machine to which the scale device is to be installed, the scale member being housed in said case member and fixed such that the fixing holes register with the corresponding fixing holes in the scale member; and
   a detector to be installed to a second part, moving in relation to the first part, of the machine, with a sensor being positioned opposite to the position signal region on the scale member, wherein the sensor detects travel of the first and second parts of the machine in relation to each other by the sensor moving relative to the scale member, the scale unit to be fixed to the first part of the machine with the fastening member inserted through the fixing holes in the scale and case members and then screwed into the mounting hole in the first part of the machine to fasten the scale member and the case member together.

2. The scale device as set forth in claim 1, wherein the case and scale members are formed from materials, respectively, different in linear expansion coefficient from each other.

3. The scale device as set forth in claim 1, wherein the case member is formed from a steel sheet bent to have a generally U-shaped section, has the scale member housed therein and fixed to an inner surface of a lateral portion thereof, and has at least the pair of fixing holes formed in the lateral portion.

4. The scale device as set forth in claim 1, wherein the scale member is fixed to the case member with an adhesive which is resistant against flexible deformation.

5. The scale device as set forth in claim 1, further comprising a reinforcing means provided between opposing surfaces of the case and scale members, respectively.

6. The scale device as set forth in claim 5, wherein:

the scale member is fixed to the case member by bonding with an adhesive; and the reinforcing means is formed from a plate-like reinforcing member having a thickness nearly equal to the layer thickness of the adhesive and has a fixing hole through which the fastening member is inserted.

7. The scale device as set forth in claim 1, wherein:

the case member is formed from a steel sheet bent to have a generally U-shaped section, has the scale member housed therein and fixed to the inner surface of a first one of the lateral portions thereof, has a pair of fixing holes formed in the lateral portion away longitudinally thereof from each other;

a side case member is provided at each end of, and in combination with, the case member to close longitudinal opposite end openings of the case member;

there is provided between opposite surfaces of the case and scale members, respectively, a reinforcing member formed from a plate-like member having a thickness nearly equal to the layer thickness of the adhesive and having a fixing hole through which the fastening member is inserted; and the reinforcing member has a stopper piece formed bent integrally on one longitudinal end thereof and which is held in contact with the side case member to prevent any displacement of the latter.

8. The scale device as set forth in claim 1, wherein the scale member has one or more rib-shaped projections formed integrally on the side thereof opposite to the case member along the full length thereof and which is or are applied to the case member.

9. The scale device as set forth in claim 1, wherein:

the scale member is fixed, by bonding with an adhesive, to the case member and has a pair of rib-shaped projections formed integrally on the side thereof opposite to the case member along at least the longitudinal opposite edges thereof; and the rib-shaped projections define the layer thickness of an adhesive applied to the side of the scale member opposite to the case member.

10. The scale device as set forth in claim 1, wherein the fastening member has a washer member fitted on the thread portion thereof for interposition between the head portion thereof and the side of the scale member opposite to the case member.

11. The scale device as set forth in claim 10, wherein:

the case member is formed to have a generally U-shaped section, has the scale member fixed, by bonding with an adhesive, to the inner surface of a first lateral portion thereof, has a pair of fixing holes formed in the first lateral portion away longitudinally thereof from each other, and has guide holes formed in a second lateral portion thereof opposite to the first lateral portion, each of the guide holes being corresponding to the fixing holes in the first lateral portion and having an inside diameter large enough to allow the fastening member to pass through; and the washer member is larger in diameter than the guide hole.

12. The scale device as set forth in claim 1, wherein each of the case member and scale member has a fixing means formed in a position different from the fixing holes formed therein and outside the position signal carrying area.

* * * * *

UNITED STATES PATENT AND TRADEMARK OFFICE
CERTIFICATE OF CORRECTION

PATENT NO. : 6,931,741 B2 Page 1 of 1
APPLICATION NO. : 10/676791
DATED : August 23, 2005
INVENTOR(S) : Gunichi Nakamura et al.

It is certified that error appears in the above-identified patent and that said Letters Patent is hereby corrected as shown below:

Column 2,
Lines 48-49, replace "$24 \times 10^-{}_6 K^{-1}$" with -- $24 \times 10^{-6} K^{-1}$ --.

Column 3,
Line 36, replace "of on the first" with -- of the first --.

Column 11,
Line 20, replace "same thickness of the adhesive" with -- same thickness as the layer thickness of the adhesive --.

Column 14,
Line 17, replace "projection 5O" with -- projection 50 --.

Column 15,
Line 60, replace "second cawing hole 63" with -- second calking hole 63 --.

Signed and Sealed this

Twenty-seventh Day of June, 2006

JON W. DUDAS
*Director of the United States Patent and Trademark Office*